United States Patent Office 3,283,011
Patented Nov. 1, 1966

3,283,011
PREPARATION OF NITROPHENOLS
William L. Cox, Mount Prospect, Ill., assignor to Universal Oil Products Company, Des Plaines, Ill., a corporation of Delaware
No Drawing. Filed Feb. 21, 1962, Ser. No. 174,717
6 Claims. (Cl. 260—622)

This invention relates to a novel process for the preparation of nitrophenols by hydrolysis of a halonitro aromatic compound, and in particular to a novel process for the preparation of p-nitrophenol by the hydrolysis of p-chloronitrobenzene.

In the commercial preparation of p-nitrophenol by hydrolysis of p-nitrochlorobenzene with aqueous caustic and acidification of the sodium p-nitrophenolate formed, it has generally been the practice to exclude air from the process, as by a nitrogen purge or the like. It has been considered that such practice serves to reduce undesirable side reactions accompanied by the formation of dark colored materials attributed to the presence of oxidation products. However, it has now been discovered that the undesirable side reactions, giving rise to reduced product yield and poor product quality, may in fact be substantially eliminated by the inclusion of a proper amount of a suitable oxidizing agent in the reaction mixture.

It is an object of the present invention to present a novel process for the preparation of nitrophenols, and in particular p-nitrophenol, which process substantially eliminates the formation of undesirable by-products which tend to reduce product yield as well as product quality.

In one of its broad aspects the present invention embodies a process which comprises reacting a halonitro aromatic compound and an alkali metal hydroxide in contact with an oxidizing agent at a temperature of from about 100° C. to about 200° C. and recovering a nitrophenol by acidification of the resulting alkali metal salt thereof.

A specific embodiment of this invention is in a process for the preparation of p-nitrophenol which comprises reacting p-chloronitrobenzene and sodium hydroxide in contact with air at a temperature of from about 140 to about 180° C. and recovering p-nitrophenol by acidification of the resulting sodium p-nitrophenolate.

Another specific embodiment of this invention is in a process for the preparation of p-nitrophenol which comprises reacting p-chloronitrobenzene and sodium hydroxide in contact with hydrogen peroxide at a temperature of from about 140° C. to about 180° C. and recovering p-nitrophenol by acidification of the resulting sodium p-nitrophenolate.

Other objects and embodiments of the present invention will become apparent in the following detailed specifications.

Nitrophenols which may be prepared in accordance with the present invention comprise a benzene nucleus, or condensed benzene nuclei, having attached thereto at least one hydroxy substituent and generally not more than three nitro substituents. Examples of nitrophenols prepared in accordance with the present process include p-nitrophenol, m-nitrophenol, o-nitrophenol, 2,4,5-trinitrophenol, 2,4,6-trinitrophenol, 2,3-dinitrophenol, 2,4-dinitrophenol, 2,5-dinitrophenol, 2,6-dinitriphenol, 2,4-dinitro-1,3-benzenediol, 2,4,6-trinitro-1,3-benzenediol, 2-methyl-3-nitrophenol, 2-methyl-4-nitrophenol, 2-methyl-4-nitrophenol, 2-methyl-5-nitrophenol, 2-methyl-6-nitrophenol, 2-methyl-4,6-dinitrophenol, 3-methyl-4-nitrophenol, 3-methyl-5-nitrophenol, 3-methyl-6-nitrophenol, 3-methyl-2,4,6-trinitrophenol, 4-methyl-2,6-dinitrophenol, 4-methyl-2-nitrophenol, 4-methyl-3-nitrophenol, etc.

The nitrophenols are prepared by hydrolisis of a corresponding halonitro aromatic compound. For example, in a preferred embodiment of this invention p-nitrophenol is prepared by the hydrolysis of p-chloronitrobenzene. Halonitro aromatic compounds which may be hydrolyzed to form their corresponding nitrophenols include 2,3-dinitrochlorobenzene, 2,4-dinitrochlorobenzene, 2,5-dinitrochlorobenzene, 2,6-dinitrochlorobenzene, 2,4,5-trinitrochlorobenzene, 2,4,6-trinitrochlorobenzene, 2,4-dinitro-1,3-dichlorobenzene, 2,4,6-trinitro-1,3-dichlorobenzene, 2-methyl-3-nitrochlorobenzene, 2-methyl-4-nitrochlorobenzene, 2-methyl-5-nitrochlorobenzene, 2-methyl-6-nitrochlorobenzene, 2-methyl-4,6-dinitrochlorobenzene, 3-methyl-4-nitrochlorobenzene, 3-methyl-5-nitrochlorobenzene, 3-methyl-6-nitrochlorobenzene, 3-methyl-2,4,6-trinitrochlorobenzene, etc., and preferably o-nitrochlorobenzene, m-nitrochlorobenzene, p-nitrochlorobenzene, and in particular the last mentioned p-nitrochlorobenzene.

While the halosubstituent of the illustrated halonitro aromatic compounds has been described as chlorine it should be understood that halonitro aromatic compounds wherein the halo substituent is bromine, fluorine or iodine, are also operable although generally less available than the chlorine compounds.

Hydrolysis of the selected halonitro aromatic compound is accomplished by reacting said halonitro aromatic compound with an alkali metal hydroxide in contact with an oxidizing agent. The halonitro aromatic compound, which is preferably p-chloronitrobenzene, is reacted with at least a stoichiometric amount of the alkali metal hydroxide. Generally a molar excess of about 2:1 or 3:1 is desirable. The alkali metal hydroxide is preferably sodium hydroxide although potassium hydroxide, lithium hydroxide, cesium hydroxide, or rubidium hydroxide may be utilized if so desired. Generally, the alkali metal hydroxide is utilized as an aqueous solution thereof.

Pressure does not appear to be an important variable in the process of the present invention and may be simply autogenous pressure developed during the course of the reaction, principally by reason of the aqueous phase of the reaction mixture at the reaction temperature employed. A reaction temperature of from about 100° C. to about 200° C. is generally operable. It is preferred to utilize a temperature of from about 140° C. to about 180° C.

The halonitro aromatic compound and the alkali metal hydroxide are reacted in contact with a mild oxidizing agent capable of functioning as an oxidizing agent in an alkaline reaction media. The oxidizing agent may be an oxygen-containing gas or a peroxy compound containing the bivalent —O—O— radical. Suitable peroxy compounds include organic peroxy compounds, for example, methyl hydroperoxide, dimethyl peroxide, ethyl hydroperoxide, diethyl peroxide, diisopropyl peroxide, di-t-butyl peroxide, acetyl peroxide, butyryl peroxide, lauryl peroxide, benzoyl peroxide, benzoyl hydroperoxide, 2,4-dichlorobenzoyl peroxide, tetraline peroxide, urea peroxide, t-butyl perbenzoate, t-butyl hydroperoxide, methylcyclohexyl hydroperoxide, diisopropylbenzoyl hydroperoxide, cumene hydroperoxide, methylethylketone peroxide, cyclohexanone peroxide, and the like. Inorganic peroxy compounds constitute a preferred class of peroxy compounds. Examples of suitable inorganic peroxy compounds include the persulfates, perborates, and percarbonates of ammonium and of the alkali metals. Hydrogen peroxide is particularly suitable as are the alkali metal peroxides and hydroperoxides, for example, sodium peroxide, sodium hydroperoxide, potassium peroxide, Potassium hydroperoxide, lithium peroxide, lithium hydroperoxide, cesium peroxide, cesium hydroperoxide, rubidium peroxide, rubidium hydroperoxide, etc.

The undesirable side reactions accompanied by the formation of ammonia and dark colored materials are substantially eliminated by the inclusion in the reaction mixture of only small amounts of the oxidizing agents herein described. While in most cases the particular oxidizing agent may be utilized in excess of from about .001 wt. percent to about 0.1 wt. percent of the halonitro aromatic compound present, no particular additional benefit results therefrom.

Hydrolysis of the halonitro aromatic compound, resulting in the nitrophenols herein described, may be effected in any suitable manner. According to one method, a quantity of the starting materials comprising, for example, p-chloronitrobenzene and an aqueous solution of sodium hydroxide, are placed in an appropriate reaction vessel provided with adequate heating and mixing means, along with an oxidizing agent which may comprise an aqueous solution of hydrogen peroxide. The reaction mixture is heated and stirred to insure intimate contact of the reactants and dispersion of the oxidizing agent throughout the reaction mixture. After a suitable reaction period the reaction mixture is cooled to about room temperature and filtered. The residue is washed with aqueous caustic solution, dried, and thereafter acidified to recover the desired nitrophenols.

Where the oxidizing agent is air or other oxygen-containing gas, for example, air or oxygen admixed with nitrogen or other inert gas, said oxygen-containing gas may be continuously introduced into the reaction mixture in a manner to insure intimate contact therewith and thereafter discharged to the atmosphere. However, as only small amounts of the oxidizing agent are required, a single initial charge of the oxygen-containing gas will be sufficient provided that adequate steps are taken to insure that said oxygen-containing gas will be dispersed throughout the reaction mixture during the entire course of the reaction period.

The following examples are presented to further illustrate the process of this invention and it is not intended that the same shall act as a limitation on the generally broad scope of the process of this invention.

*Example I*

In this example 2270 g. of p-chloronitrobenzene and 1725 g. of sodium hydroxide and 6900 ml. of water were charged to a glass liner together with 23 g. of a 30% aqueous solution of hydrogen peroxide and the glass liner was sealed in a rotating autoclave. The autoclave contents were slowly heated to a temperature of about 160° C. and maintained at said temperature for a period of about 4 hours during which time the autoclave was constantly rotated. The autoclave contents were thereafter cooled to about room temperature and filtered. The residue was washed with small amounts of a 30% aqueous caustic solution and dried. A yield of 96.3% of sodium p-nitrophenolate was recovered in the form of yellow crystalline material. The sodium p-nitrophenolate is acidified by immersing in hot dilute hydrochloric acid, cooling and filtering.

*Example II*

In this example 2270 g. of p-chloronitrobenzene and 2309 g. of sodium hydroxide in about 13 l. of water were charged to a top-stirred 5 gallon autoclave. The autoclave contents were brought to a temperature of about 160° C. over a 1 hour period and maintained at this temperature with stirring for a period of 4 hours. Air was continuously added to the reaction mixture and dispersed therethrough during the course of the reaction. The pressure was not permitted to exceed about 80 p.s.i.g. At the expiration of the 4 hour period the autoclave contents were cooled to about room temperature and filtered. The residue was washed with a 30% aqueous caustic solution and dried. A 98.1% yield of sodium p-nitrophenolate was recovered as a yellow crystalline material. p-Nitrophenolate was recovered on acidification of the sodium p-nitrophenolate as in Example I.

*Example III*

In this example about 10 g. of t-butyl peroxide is added to about 2270 g. of p-chloronitrobenzene and charged to a rotating autoclave together with about 1725 g. of sodium hydroxide and 6900 ml. of water. The reaction mixture is heated at 140–180° C. over a 4–6 hour period. The reaction mixture is thereafter cooled and filtered and the residue is caustic washed and dried. The sodium p-nitrophenolate thus prepared is treated with hydrochloric acid to form the desired p-nitrophenol.

*Example IV*

In this example about 2270 g. of p-chloronitrobenzene and 1725 g. of sodium hydroxide in 6900 ml. of water are charged to a top-stirred autoclave together with about 10 g. of sodium peroxide in aqueous solution. The reaction mixture is heated at 140–180° C. over a 4–6 hour period. The reaction mixture is thereafter cooled and filtered and the residue caustic washed and dried. The sodium p-nitrophenolate thus prepared is treated with hydrochloric acid to form the desired p-nitrophenol.

I claim as my invention:

1. In the preparation of a nitrophenol by the hydrolysis of a halonitrobenzene with an aqueous solution of an alkali metal hydroxide at a temperature of from about 100° C. to about 200° C., wherein there are formed ammonia and dark colored materials, the improvement which comprises introducing a free oxygen-containing gas to the reaction mixture and intimately contacting the gas with and dispersing the same throughout the reaction mixture during the hydrolysis of the halonitrobenzene to substantially eliminate the formation of said ammonia and dark colored materials, whereby to enhance the yield and quality of the nitrophenol product.

2. In the preparation of a nitrophenol by the hydrolysis of a chloronitrobenzene with an aqueous solution of sodium hydroxide at a temperature of from about 100° C. to about 200° C., wherein there are formed ammonia and dark colored materials, the improvement which comprises introducing a free oxygen-containing gas to the reaction mixture and intimately contacting the gas with and dispersing the same throughout the reaction mixture during the hydrolysis of the chloronitrobenzene to substantially eliminate the formation of said ammonia and dark colored materials, whereby to enhance the yield and quality of the nitrophenol product.

3. In the preparation of p-nitrophenol by the hydrolysis of p-chloronitrobenzene with an aqueous solution of sodium hydroxide at a temperature of from about 140° C. to about 180° C., wherein there are formed ammonia and dark colored materials, the improvement which comprises introducing a free oxygen-containing gas to the reaction mixture and intimately contacting the gas with and dispersing the same throughout the reaction mixture during the hydrolysis of the chloronitrobenzene to substantially eliminate the formation of said ammonia and dark colored materials, whereby to enhance the yield and quality of the nitrophenol product.

4. In the preparation of a nitrophenol by the hydrolysis of a halonitrobenzene with an aqueous solution of an alkali metal hydroxide at a temperature of from about 100° C. to about 200° C., wherein there are formed ammonia and dark colored materials, the improvement which comprises mixing and intimately contacting the reactants with a hydroperoxide during the hydrolysis to substantially eliminate the formation of said ammonia and dark colored materials, whereby to enhance the yield and quality of the nitrophenol product.

5. In the preparation of a nitrophenol by the hydrolysis of a chloronitrobenzene with an aqueous solution of sodium hydroxide at a temperature of from about 100° C. to about 200° C., wherein there are formed ammonia and dark colored materials, the improvement which comprises mixing and intimately contacting the reactants with a hydroperoxide during the hydrolysis to substantially eliminate the formation of said ammonia and dark colored materials, whereby to enhance the yield and quality of the nitrophenol product.

6. In the preparation of p-nitrophenol by the hydrolysis of p-chloronitrobenzene with an aqueous solution of sodium hydroxide at a temperature of from about 140° C. to about 180° C., wherein there are formed ammonia and dark colored materials, the improvement which comprises mixing and intimately contacting the reactants with a hydroperoxide during the hydrolysis to substantially eliminate the formation of said ammonia and dark colored materials, whereby to enhance the yield and quality of the nitrophenol product.

References Cited by the Examiner

UNITED STATES PATENTS 2,349,514 5/1944 Moyer _____ 260—702
2,778,854 1/1957 Stoltz _____ 260—702

OTHER REFERENCES

Aoyama et al.: "Chem. Abstracts," vol. 29, page 7957 (1935), citing J. Pharm. Soc. Japan, vol. 55, 145–8, (1935).

Popov: "Chem. Abstracts," vol. 25, page 2707, (1931), citing Ukrainskii Khem. Zhur. 5, Tech. pt. 105–10, (1930).

LEON ZITVER, *Primary Examiner.*

R. K. JACKSON, W. B. LONE, *Assistant Examiners.*